United States Patent [19]
Griffiths

[11] 3,907,309
[45] Sept. 23, 1975

[54] RESILIENT SEAL

[75] Inventor: Edward Griffiths, Birmingham, England

[73] Assignee: Caterpillar Tractor Company, Great Britain

[22] Filed: Aug. 12, 1974

[21] Appl. No.: 496,729

[52] U.S. Cl. .................................................. 277/84
[51] Int. Cl.² .......................................... F16J 15/34
[58] Field of Search ......... 277/84, 88, 81, 138, 142, 277/143, 178, 184, 189, 235 B, 204, 205

[56] References Cited
UNITED STATES PATENTS

| | | | |
|---|---|---|---|
| 2,420,039 | 5/1947 | Frisby | 277/84 |
| 3,331,609 | 7/1967 | Moran | 277/84 |
| 3,511,511 | 5/1970 | Voitik | 277/84 |
| 3,520,544 | 7/1970 | Taylor | 277/205 |
| 3,780,791 | 12/1973 | Barnard | 277/88 |

*Primary Examiner*—Robert I. Smith
*Attorney, Agent, or Firm*—Gifford, Chandler & Sheridan

[57] ABSTRACT

A resilient seal, for engagement between two surfaces, comprising an annular sealing portion of resilient sheet metal and having a transverse cross-section of channel shape, the base of the channel having a depression in its surface external to the channel and extending throughout the circular length of the seal, the seal also comprising a wire ring shrunk on the sealing portion and located in the depression in the base of the channel to urge the base of the channel inwardly and to cause the sides of the channel to be pressed laterally-outwardly of the channel into sealing engagement with the sealing surfaces.

4 Claims, 3 Drawing Figures

RESILIENT SEAL

BACKGROUND OF THE INVENTION

The invention relates to a resilient seal for engagement between two surfaces and is particularly concerned with a seal which will restrain a pressurised fluid from leakage past the seal despite a temperature or pressure differential, or both, across the seal. An object of the invention is to provide such a seal which can maintain sealing across a gap of variable or non-uniform width and between relatively rotatable or slidable surfaces.

SUMMARY OF THE INVENTION

According to the invention, a resilient seal for engagement between two surfaces comprises an elongate sealing portion formed from resilient sheet material and having a transverse cross-section of channel shape, the base of the channel having a depression in the surface thereof external to the channel and extending throughout the length of the seal, the seal also comprising a constraining element located in the depression in the base of the channel and extending lengthwise thereof and acting to urge the base of the channel inwardly, thereby to cause the sides of the channel to be pressed laterally-outwardly of the channel into sealing engagement with the respective surfaces.

The sealing portion is conveniently in the shape of a closed or substantially closed figure, and in that case the constraining member is a continuous band which is contracted around the seal to effect inward distortion of the base of the channel and hence laterally-outward distortion of the sides of the channel into sealing engagement with the respective surfaces.

Preferably the band is shrunk on to the sealing portion, whereby, when the band has assumed its shrunken peripheral length, the inward distortion of the base of the channel and the laterally-outward distortion of the sides of the channel will be effected.

In one form of resilient seal in accordance with the invention, the sealing portion is of resilient metal sheet formed into a ring having a transverse cross-section of said channel shape throughout the peripheral length thereof and the constraining element is a wire ring which is shrunk on to the sealing ring.

BRIEF DESCRIPTION OF THE DRAWING

By way of example, a seal in accordance with the invention is now described with reference to the accompanying drawing, in which.

DETAILED DESCRIPTION

Figure 1:
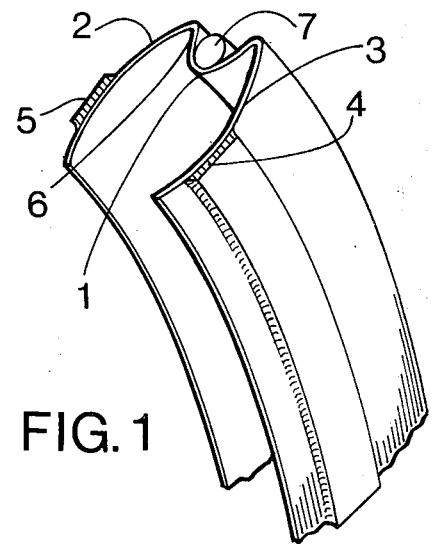
FIG. 1 is a perspective view of a portion of the assembled seal.

Referring to the drawings, (particularly FIG. 1) the seal comprises a sealing portion in the form of a ring formed from resilient sheet metal capable of withstanding the operational temperatures to which the seal will be effected. The ring is of channel shape in transverse cross-section and comprises a base 1 and two diverging sides 2 and 3 having respectively on their outer surfaces sealing regions 4 and 5 extending around the ring. The base 1 of the ring has a depression 6 in the surface thereof which is external to the channel. This may be the radially-outer periphery of the ring as illustrated, or, where the channel is inverted with respect to that shown in the Figures, the radially inner periphery of the ring.

The depression 6 extends throughout the circumferential length of the ring and it contains a wire ring 7 capable of withstanding the operating temperatures contemplated. The wire ring 7 is heated and shrunk on to the sealing ring so that when the wire ring 7 has cooled and contracted, it will have become located in the depression 6 and it will urge the base 1 of the channel inwardly thereof, thereby causing the sides 2 and 3 to diverge further so as to cause the sealing regions 4 and 5 to be resiliently held in sealing engagement with two surfaces, for example surfaces 8 and 9 (see FIG. 2), between which sealing is to be effected.

The wire ring 7 may be shrunk into position before the seal is placed between the two surfaces, such as 8 and 9, that is the seal is pre-assembled. The diameter of the wire ring 7 when it has cooled is such that the sides 2 and 3 of the seal will diverge to a predetermined distance between the sealing surfaces of the regions 4 and 5 when the latter are not engaged between surfaces such as 8 and 9 or will exert a predetermined sealing force when they are constrained between surfaces a known distance apart. Alternatively, in some applications, it may be necessary to place the sealing ring between the surfaces to be sealed before the wire ring 7 is shrunk into the depression 6.

The seal may be used between two relatively rotatable or slidable surfaces or one or both of the surfaces may be stationary. Additionally or alternatively, the gap between the two surfaces, for example 8 and 9, to be sealed may be variable due to pressure or temperature changes. The seal may also be used where the gap between the surfaces, for example 8 and 9, is non-uniform or is not of a predetermined width as the seal is capable of being effective over a range of sealing widths because of its resilience.

Where the two surfaces being sealed slide or rotate relatively to each other, the sealing regions 4 and 5 of the sealing ring which engage the surfaces to be sealed may be coated with an anti-friction coating, for example polytetraflouroethylene.

The seal may be of comparatively large diameter as in a seal engaging between a heat exchanger matrix adjacent its periphery and a stationary housing therefor, or it may be of smaller diameter for example, where the seal is to engage between a shaft and a housing therefor.

The seal has been devised particularly for use in sealing the matrix or a shaft in a rotary regenerative heat exchanger, where fluids at different pressures or at different temperatures, or both, inside and outside the sealing ring are to be prevented from passing the sealing regions 4 and 5. However, the seal has many other engineering applications and has the advantage of being comparatively cheap to manufacture.

Figure 2:
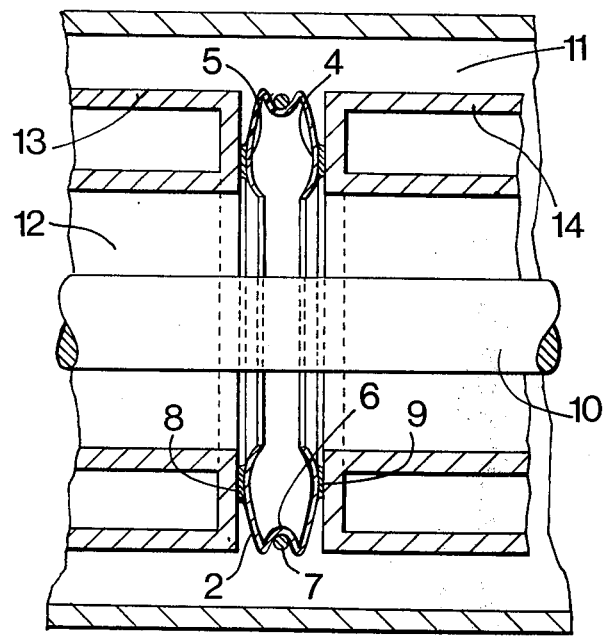
FIGS. 2 and 3 are axial sections showing the assembled seal shown in use between two surfaces in two alternative pratical applications.

FIG. 2 shows an arrangement in which the seal 3 surrounds a shaft 10 and is employed to seal a hot fluid in a duct 11 from a colder fluid in a duct 12 surrounding the shaft 10. The ducts 11 and 12 are shown separated by annular housing parts 13, 14 on which the aforesaid annular sealing surfaces 8, 9 respectively are provided. The space between the sealing surfaces in which the seal 3 is located may be of variable axial width. Furthermore one of the surfaces may be stationary and the other may be carried and rotated by the shaft 10.

Figure 3:
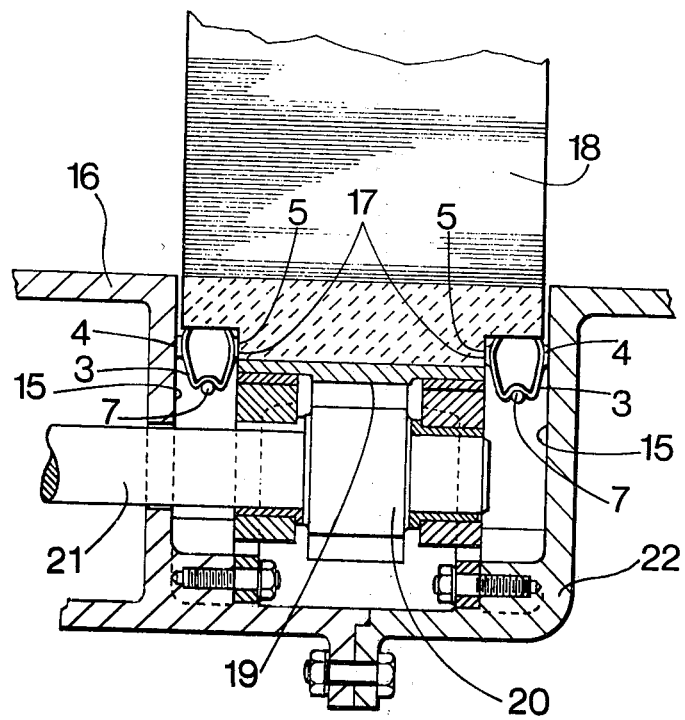

FIG. 3 shows an arrangement where the seal 3 is of larger diameter and is shown surrounding a matrix disc of a rotary regenerative heat exchanger. A pair of identical seals 3 are shown, one adjacent each end face of the matrix disc. The sealing regions 4, 5 of each seal 3 engages respectively a stationary face 15 of the heat exchanger housing 16 and a shoulder 17 on the rotatable matrix disc 18. Thus this is an application where the seal acts between a stationary and a rotating surface and moreover the width of the gap to be sealed is variable due to differential expansion between the housing and the matrix disc, the former usually being made of metal and having a high co-efficient of expansion and the latter being a ceramic and having a very low co-efficient of expansion. The matrix disc 18 illustrated is of the kind which has a toothed driven annulus 19 engaged by a driving pinion 20 carried by a shaft 21. The driving pinion 20 and the pinion end of the shaft 21 are housed in a chamber 22 forming part of the housing 16 and containing lubricating oil for the shaft bearing and the meshing gears. When the pinion is being rotated, oil will therefore be thrown around the chamber 22. Cold air is passed through the heat exchange passages in the matrix disc 18 and is heated therein. Thus in this application the two seals 3 act to restrain cold and hot air at high pressure from leakage around the periphery of the matrix disc 18 and from leakage into the chamber 22 containing air and oil at lower pressure, substantially atmospheric, and also act to keep lubricating oil from contaminating the air passing through the matrix disc 18.

Although the sealing ring has been described as being a complete or substantially complete annulus, it could for example be a straight or curved elongate seal, in which case the constraining element may be, for example, a wire or band which extends along the depression in the outside of the seal and around, or anchored at its ends to, adjacent structure.

Although the illustrated example teaches the use of a wire ring which is shrunk into the depression, another form of constraining ring or band may be used, such as a tension spring.

What I claim as my invention and desire to secure by Letters Patent of the United States is:

1. A resilient seal, for engagement between two surfaces, comprising an elongate sealing portion formed from resilient sheet material and having a transverse cross-section of channel shape, the base of the channel having a depression in the surface thereof external to the channel and extending throughout the length of the seal, the seal also comprising a constraining element located in the depression in the base of the channel and extending lengthwise thereof and acting to urge the base of the channel inwardly, thereby to cause the sides of the channel to be pressed laterally-outwardly of the channel into sealing engagement with the respective surfaces.

2. A seal as claimed in claim 1 in which the sealing portion is in the shape of a closed or substantially closed figure, the constraining member being a continuous band which is contracted around the seal to effect inward distortion of the base of the channel and hence laterally-outward distortion of the sides of the channel into sealing engagement with the respective surfaces.

3. A seal as claimed in claim 2 in which the band is shrunk on the sealing portion, whereby, when the band has assumed its shrunken peripheral length, the inward distortion of the base of the channel and the laterally-outward distortion of the sides of the channel will be effected.

4. A seal as claimed in claim 3 in which the sealing portion is of resilient metal sheet formed into a ring having a transverse cross-section of said channel shape throughout the peripheral length thereof and the constraining element is a wire ring which is shrunk on to the sealing ring.

* * * * *

UNITED STATES PATENT OFFICE
CERTIFICATE OF CORRECTION

PATENT NO. : 3,907,309

DATED : September 23, 1975

INVENTOR(S) : Edward Griffiths

It is certified that error appears in the above-identified patent and that said Letters Patent are hereby corrected as shown below:

On the front page of the patent insert:

--Foreign Applications Priority Data
    August 15, 1973    Great Britain    39555/73--

Signed and Sealed this twenty-third Day of March 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

PATENT NO. : 3,907,309
DATED : September 23, 1975
INVENTOR(S) : Edward Griffiths It is certified that error appears in the above-identified patent and that said Letters Patent are hereby corrected as shown below:

Change the Assignee to read:

--Caterpillar Tractor Co.--

Signed and Sealed this

Tenth Day of August 1976

[SEAL]

Attest:

RUTH C. MASON
Attesting Officer

C. MARSHALL DANN
Commissioner of Patents and Trademarks